Dec. 6, 1932.  E. McCARTHY  1,890,397
FRUIT DRIER
Filed Aug. 11, 1931   3 Sheets-Sheet 1

Inventor
Ernest McCarthy
By Philip A. Furell
Attorney

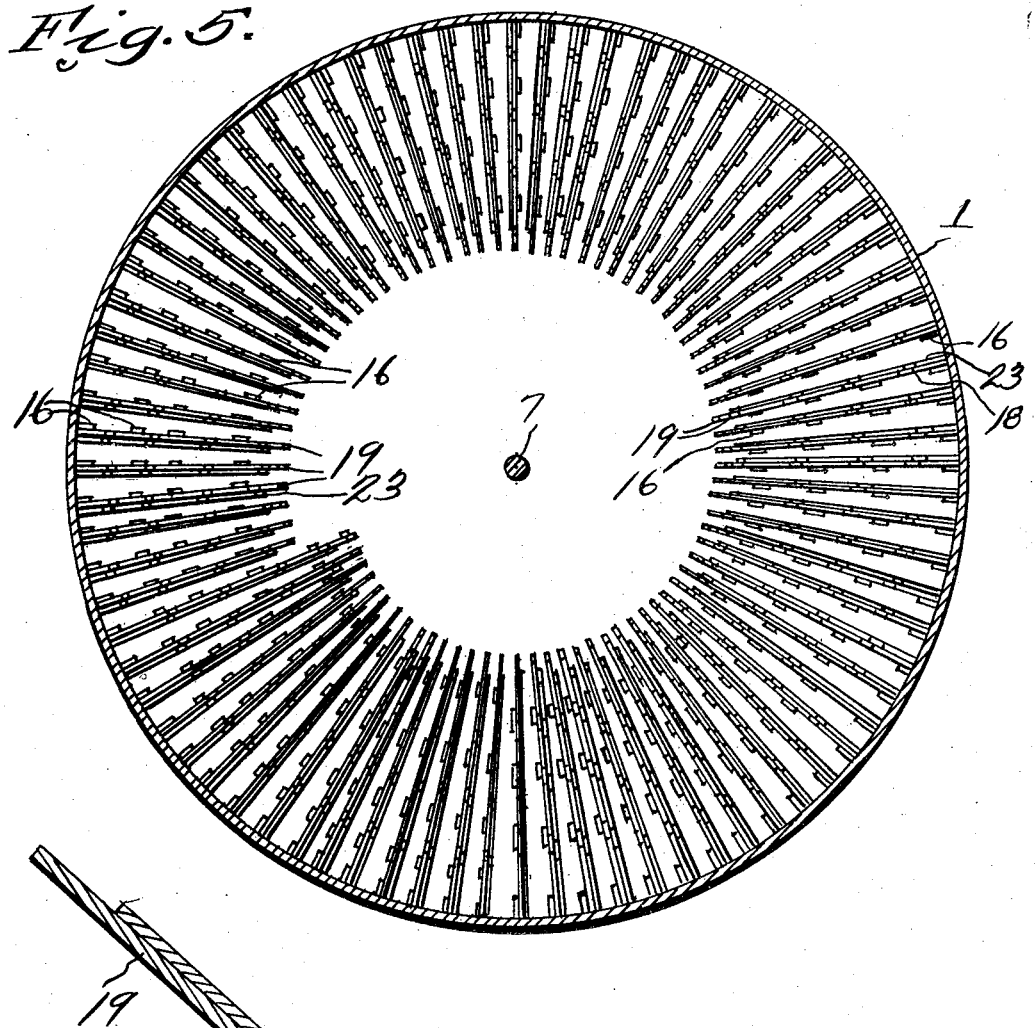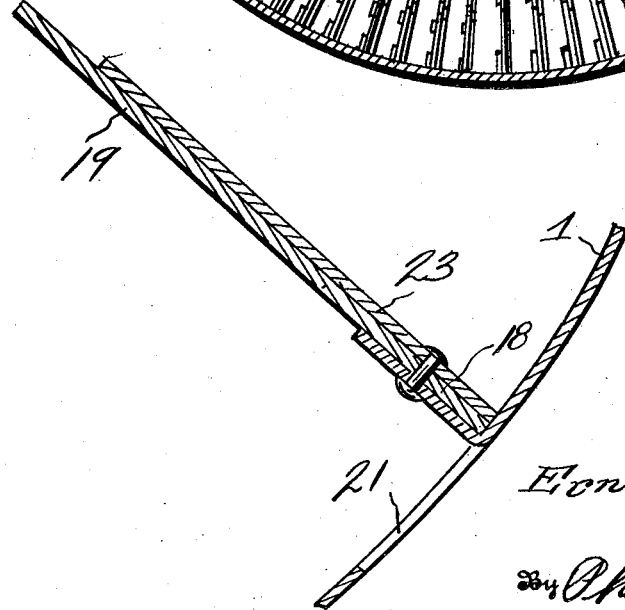

Dec. 6, 1932.  E. McCARTHY  1,890,397
FRUIT DRIER
Filed Aug. 11, 1931  3 Sheets-Sheet 3
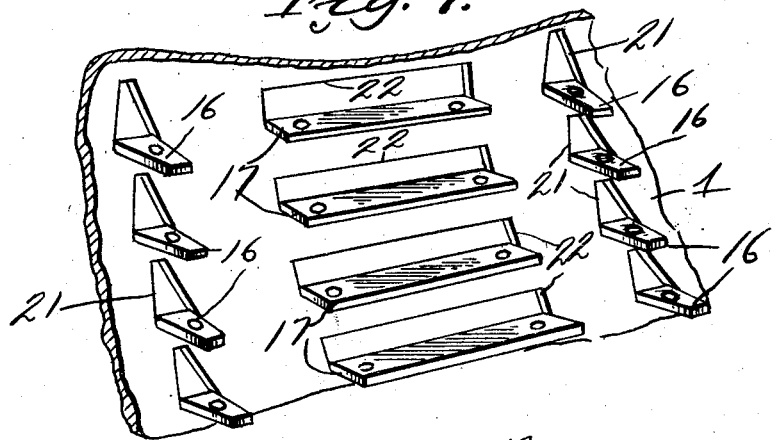
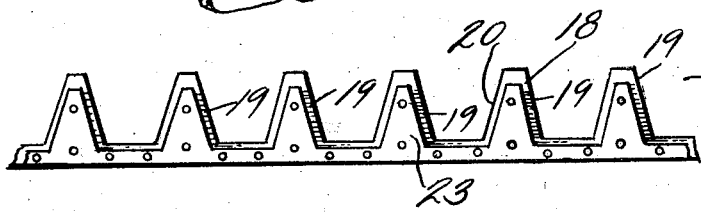
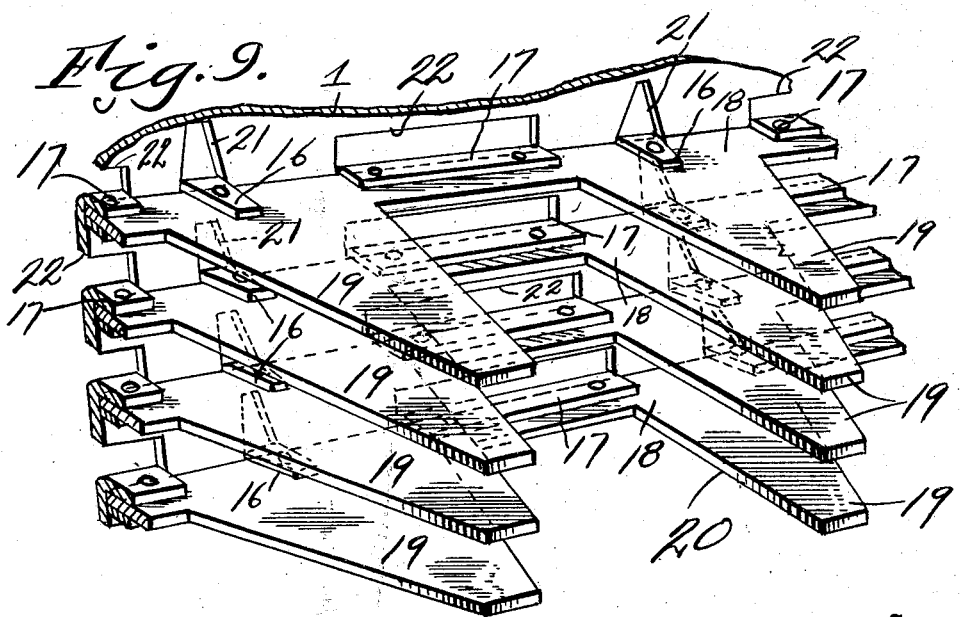
Ernest McCarthy, Inventor
By Philip A. Terrell, Attorney Patented Dec. 6, 1932

1,890,397

UNITED STATES PATENT OFFICE

ERNEST McCARTHY, OF ORLANDO, FLORIDA

FRUIT DRIER

Application filed August 11, 1931. Serial No. 556,443.

The invention relates to fruit drying machines, and has for its object to provide a device of this character comprising a rotatable drum having a spiral raceway therethrough formed from wiping elements, whereby as fruit is conveyed through the rotatable drum, it will roll through the spiral raceway and the moisture will be wiped therefrom during its passage.

A further object is to form the spiral raceway from a plurality of flexible wiping elements which will engage the peripheries of the fruit passing through the device and wipe the moisture therefrom after a washing operation.

A further object is to form the wiping elements from strips of sheet rubber having spaced notches through which notches the fruit passes as it is conveyed through the drum.

A further object is to provide heads within the ends of the drum and having entrance and exit passages through which the fruit passes into the drum for the drying operation and out of the drum after the drying operation.

A further object is to provide longitudinally and radially disposed strips within the intake and discharge end of the device for additionally wiping and cushioning articles as they are introduced and discharged into the machine. Also to dispose wiping strips on the wall adjacent the intake end.

A further object is to provide one of the heads of the drum with vanes forming a fan for forcing air through the drum as it rotates as an additional drying means.

A further object is to provide the drum with inwardly extending lugs to which the flexible wiping elements are attached. Also to form the flexible wiping elements from two layers of flexible material, preferably rubber, and one of said layers smaller than the other for increasing the flexibility of the other layer, but allowing a wider range of flexibility to the marginal edge of the other wiping element, so that it will easily conform to the contour of fruit passing through the spiral passage.

A further object is to strike inwardly the lugs, to which the wiping elements are attached, thereby in addition to forming supporting means for the wiping elements, apertures in the drum through which air may pass after it is forced into the drum by the fan.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 5 is a vertical transverse sectional view taken on line 5—5 of Figure 1.

Figure 6 is an enlarged transverse sectional view through a portion of the drum and one of the wiping elements.

Figure 7 is a detail perspective view of a portion of the cylinder, showing the struck-in lugs to which the wiping elements are attached.

Figure 8 is a plan view of one of the wiping elements, showing the stiffening flexible strip attached thereto.

Figure 9 is a detail perspective view of a portion of the drum, showing portions of wiping strips forming the channel.

Figure 1:
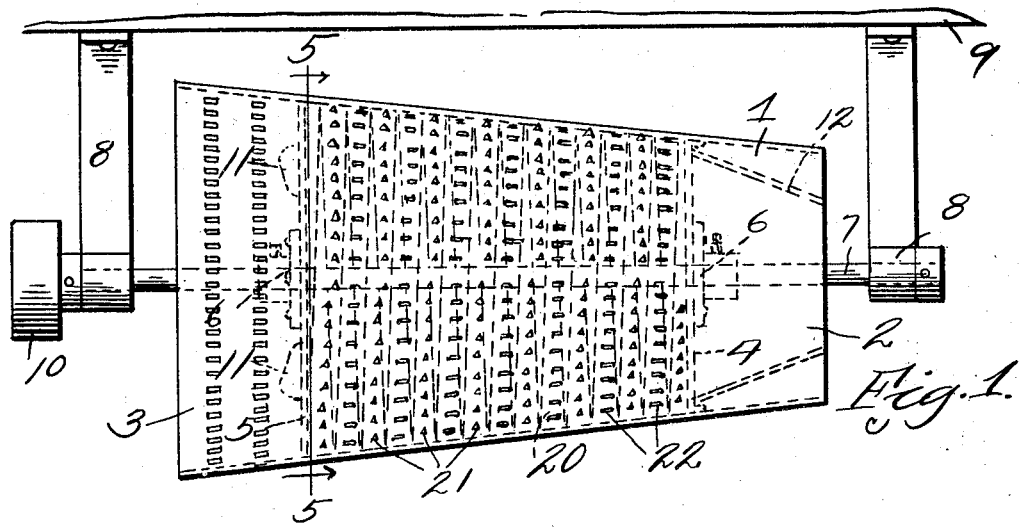
Figure 1 is a side elevation of the drier.
Figure 2:
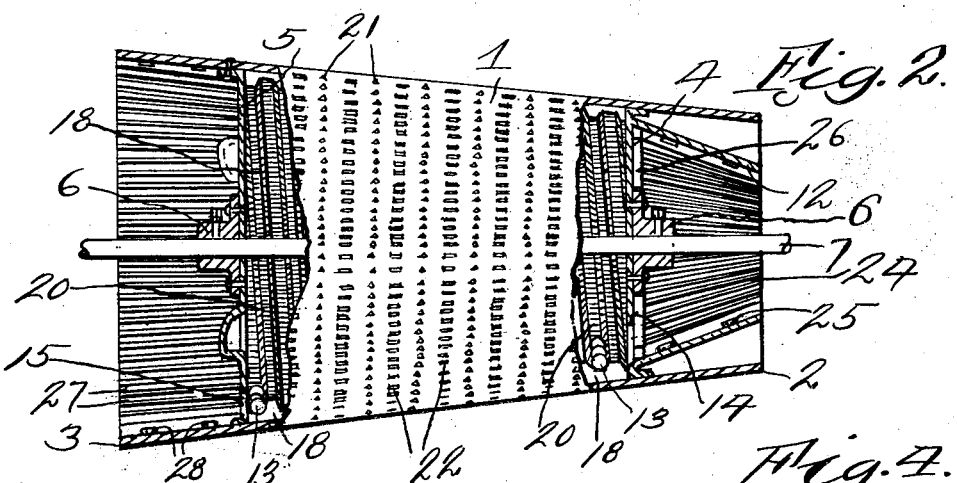
Figure 2 is a view similar to Figure 1, but showing the ends of the drier in vertical longitudinal section.
Figure 3:
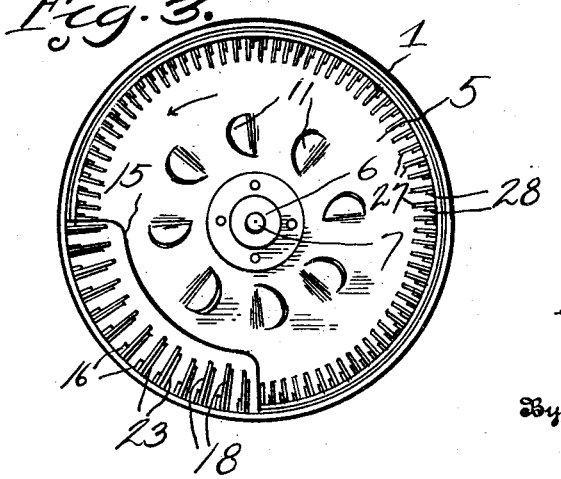
Figure 3 is an end view looking into the fan end of the device.
Figure 4:
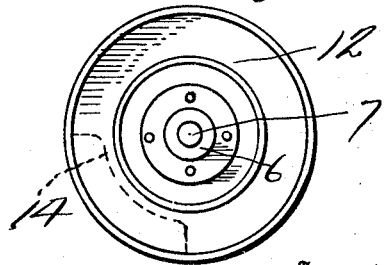
Figure 4 is an end view looking into the feeding end of the device.

Referring to the drawings, the numeral 1 designates a rotatable drum, which is preferably tapered as shown to facilitate the feeding operation from the feeding end 2 thereof to the discharge end 3. Disposed within the ends of the drum 1 are partitions 4 and 5, which partitions are provided with bearings 6 through which the rotatable shaft 7 extends. Shaft 7 has its ends rotatably mounted in supporting brackets 8, preferably depending from an overhead support 9. One end of shaft 7 is provided with a pulley 10, which may be driven in any manner desired for imparting rotation to the drum 1.

The partition 5 is provided with struck out vanes 11 forming a blower whereby air is forced through the drum for facilitating the drying operation.

Disposed within the feeding end 2 of the drum is a frusto conically shaped member 12, into which the fruit 13, to be dried, is discharged in any suitable manner, so that it will move by gravity towards the arcuate opening 14 in the partition 4 to be fed to the conveyor and drier as the drum rotates. The partition 5 at the other end of the drum is provided with an arcuately shaped discharge opening 15, through which the fruit is discharged from the drier and conveyor, so that it can move by gravity from the large end 3 of the drum into receptacles or other conveying means if desired. Although the device is shown as suspended from overhead and driven from a pulley, it is obvious this kind of support may be varied as well as the drive, and it is also obvious that the length of the device may be varied.

The drum 1 is formed from sheet metal and has struck inwardly therefrom in spiral arrangement alined apertured lugs 16 and flanges 17, to which the flexible wiping strips 18 are attached so that their V-shaped projections 19 form a spiral channel 20 through the drum, and through which channel fruit rolls during the rotation of the drum 1, it being understood that the speed of the drum is to be such that there will be a rolling of the fruit through the channel, but not sufficient for centrifugal action to hold the fruit so that it will rotate with the drum.

The flexible wiping strips 18 are preferably formed from rubber so that when fruit rolls through the channel 20, the outer periphery thereof will be thoroughly wiped with a squeegee operation, thereby insuring the removal of excess water, and which water will flow from the drum through the apertures 21 and 22 formed when the lugs 16 and 17 are struck inwardly from the drum.

As the drum rotates air is forced into the drum by the fan blades 11, which may be located on either or both ends of the drum, and this additional air dries the fruit by evaporation. The air forced into the drum escapes to the atmosphere through the apertures 21 and 22. Wiping strips 18 are formed from relatively light material, which will easily conform to the outer periphery of fruit for wiping the same, however to secure sufficient rigidity of the main body of the strips, a second strip 23 is provided for each of the strips. Strip 23 is on slightly smaller dimensions than the strip 18 as clearly shown in Figures 8 and 6, thereby allowing the marginal edges of the strip 18 and its projections 19 to bend to conform to the shape of the fruit, but provides sufficient rigidity to insure a positive wiping operation. Although the strips are described as being formed from rubber, it is obvious any other material may be used, and applicant does not limit himself in this particular. As the lugs 16 and 17 are spirally disposed on the drum, it will be seen that the strips, when attached to the lugs as shown in Figure 9, will, through the medium of their projections 19, form a channel 20 for the passage of the fruit. It will also be noted that the strips 18 may be formed in relatively long sections and placed in position and severed after the proper adjustment of the strip. By so forming the strip, it is obvious that they may be cheaply manufactured and properly positioned within the drum for forming the spiral channel with little difficulty.

Disposed within the frusto conically shaped intake member 12 is a plurality of longitudinally disposed flexible strips 24 held by lugs 25 similar to the lugs 16; these strips not only wipe but prevent injury to the fruit at the intake end of the device.

The end wall 4 is provided with wiping strips 26 which assist in the wiping operation, and also prevent damage to the fruit during the rotation of the device.

Disposed within the discharge end 3 are longitudinally and radially disposed strips 27 carried by struck-in lugs 28, which additionally wipe the fruit and prevent damage thereto.

Although the device is described as a drum or a cylindrical member, it is obvious it can be tapered, round, square, hexgaonal or any other shape desired.

From the above it will be seen that a drying machine is provided for fruit, particularly oranges, and which device not only conveys the fruit during the drying operation, but positively wipes the sides thereof as it rolls through a channel between projections of wiping strips. It will also be seen that any water which may gather in the drum will immediately drain therefrom through apertures 20 and 21.

The spiral arrangement of the wiping elements have the additional function in combination with the blower vanes 11 of increasing the current of air through the device during the wiping and drying operation.

The invention having been set forth what is claimed as new and useful is:—

1. A fruit drying machine comprising a rotatable drum, a spiral wiping channel within the drum and through which fruit passes during the rotation of the drum, said channel being formed by strips of material in spaced relation, projections carried by said strips of material in spaced relation and spirally arranged within the drum and means for anchoring said strips of material to the inner periphery of the drum.

2. A fruit drier comprising a rotatable drum, a spiral wiping channel within the drum, said channel being formed from spaced strips having projections in spaced relation and spirally positioned, said strips and projections being formed from flexible material and means for anchoring said strips to the inner periphery of the drum.

3. A fruit drier comprising a rotatable drum, a spiral wiping channel within the drum, said channel being formed from spaced strips having spaced projections, said projections being spirally arranged and inwardly struck lugs carried by the drum and to which the strips are anchored.

4. A fruit drier comprising a rotatable drum, a spiral wiping channel within the drum, said channel being formed from spaced strips, spaced projections carried by said strips, said strips and projections being formed from flexible material, the projections of adjacent strips being in spiral relation, said strips being anchored to the inner side of the drum.

5. A fruit drier comprising a rotatable drum, a spiral wiping channel within the drum, said channel being formed from spaced strips, spaced projections carried by said strips, said strips and projections being formed from flexible material, the projections of adjacent strips being in spiral relation, said strips being anchored to the inner side of the drum, and strips conforming in contour to the first mentioned strips but of smaller dimension secured to one of the sides of the first mentioned strip and forming means whereby the first mentioned strips are stiffened at points spaced from their marginal edges.

6. The combination with a fruit drier comprising a rotatable drum, of a spiral wiping channel within the drum, said channel being formed from spaced strips, spaced projections carried by said strips, said strips and projections being formed from flexible material, the projections of adjacent strips being in spiral relation, second strips formed from flexible material secured to one of the sides of the first mentioned strips, said second strips forming means whereby the first mentioned strips are flexibly stiffened at points spaced from their marginal edges and means for securing said strips to the inner side of the drum.

7. A fruit wiping and conveying device comprising a rotatable member having a spiral passage through a chamber therein, said spiral passage being formed from elongated flat flexible strips having spaced projections and wiping elements at the intake and discharge ends of said rotatable member, said last named wiping elements being formed from straight strips without projections and longitudinally disposed.

In testimony whereof he hereunto affixes his signature.

ERNEST McCARTHY.